United States Patent
Yang et al.

(10) Patent No.: US 11,289,092 B2
(45) Date of Patent: Mar. 29, 2022

(54) TEXT EDITING USING SPEECH RECOGNITION

(71) Applicant: International Business Machines Corporation, Armonk, NY (US)

(72) Inventors: JunXing Yang, Shenzhen (CN); XueJun Zhong, Shenzhen (CN); Wei Sun, Shenzhen (CN); ZhiXia Wang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 16/582,663

(22) Filed: Sep. 25, 2019

(65) Prior Publication Data
US 2021/0090571 A1  Mar. 25, 2021

(51) Int. Cl.
  *G10L 15/26* (2006.01)
  *G10L 15/08* (2006.01)
  *G06F 40/166* (2020.01)
  *G10L 15/22* (2006.01)

(52) U.S. Cl.
  CPC ............ *G10L 15/26* (2013.01); *G06F 40/166* (2020.01); *G10L 15/08* (2013.01); *G10L 2015/088* (2013.01); *G10L 2015/223* (2013.01)

(58) Field of Classification Search
  CPC .. G06B 1/25; H04B 1/25; H04M 1/25; H04N 1/25; H04L 1/25; G06N 1/25
  See application file for complete search history.

(56) References Cited

U.S. PATENT DOCUMENTS

| | | | | | |
|---|---|---|---|---|---|
| 5,479,563 | A | * | 12/1995 | Yamaguchi | G10L 15/05 704/232 |
| 5,587,902 | A | * | 12/1996 | Kugimiya | G06F 40/143 704/2 |
| 5,909,667 | A | * | 6/1999 | Leontiades | G10L 15/22 704/275 |

(Continued)

FOREIGN PATENT DOCUMENTS

EP   2261893 B1   3/2016

OTHER PUBLICATIONS

"Windows Speech Recognition commands", Windows Help, Last Updated: Jan. 22, 2019, 13 pages, <https://support.microsoft.com/en-in/help/12427/windows-speech-recognition-commands>.

(Continued)

*Primary Examiner* — Neeraj Sharma
(74) *Attorney, Agent, or Firm* — Michael A. Petrocelli

(57) ABSTRACT

A method, system and computer program product for editing a text using speech recognition includes receiving, by a computer, a first voice input from a user comprising a first target word. The computer identifies instances of the first target word within the text and assigns a first numerical indicator to each instance of the first target word within the text. A selection is received from the user including the first numerical indicator corresponding to a starting point of a selection area. The computer receives a second voice input from the user including a second target word, identifies instances of the second target word within the text, assigns a second numerical indicator to each instance of the second target word, and receives a selection from the user including the second numerical indicator corresponding to an ending point of the selection area.

20 Claims, 10 Drawing Sheets

(56) References Cited

U.S. PATENT DOCUMENTS

| | | | |
|---|---|---|---|
| 7,587,387 B2* | 9/2009 | Hogue | G06F 16/951 |
| 10,282,404 B2 | 5/2019 | Reicher | |
| 10,923,118 B2* | 2/2021 | Li | G10L 15/22 |
| 11,024,406 B2* | 6/2021 | Sadeghi | G06Q 10/10 |
| 2010/0299199 A1* | 11/2010 | Kang | G06F 16/9535 |
| | | | 705/14.49 |
| 2013/0232408 A1* | 9/2013 | Xu | G06F 3/0488 |
| | | | 715/256 |
| 2014/0297628 A1* | 10/2014 | Tsuji | G06F 16/3346 |
| | | | 707/723 |
| 2015/0193200 A1 | 7/2015 | Zeng | |
| 2017/0345410 A1* | 11/2017 | Smith | G06F 40/117 |
| 2018/0018308 A1 | 1/2018 | Zuo | |

OTHER PUBLICATIONS

Mell et al., "The NIST Definition of AC Cloud Computing", NatioAnal Institute of Standards and Technology, Special Publication 800-145, Sep. 2011, 7 pages.

\* cited by examiner

TEXT EDITING USING SPEECH RECOGNITION

BACKGROUND

The present invention generally relates to the field of speech recognition, and more particularly to a method, system and computer program product for editing a text using speech recognition.

Current electronic devices (e.g., tablets, smartphones, etc.) typically include a touchscreen display. In some situations, editing a text using the device's touchscreen can be impractical and tedious. Advances in artificial intelligence and natural language processing techniques have facilitated the development of technologies aiming to provide a way to edit a text using voice commands. However, existing technologies may lack accuracy in the text selection process causing erroneous execution of copy, paste, cut, delete and/or insert functionalities.

SUMMARY

Shortcomings of the prior art are overcome and additional advantages are provided through the provision of a method for editing a text using speech recognition that includes receiving, by a computer, a first voice input from a user including a first target word. The computer identifies instances of the first target word within the text, assigs a first numerical indicator to each instance of the first target word, receives a selection from the user including the first numerical indicator corresponding to a starting point of a selection area. Further, the computer receives a second voice input from the user including a second target word, identifies instances of the second target word within the text, assigns a second numerical indicator to each instance of the second target word, and receives a selection from the user including the second numerical indicator corresponding to an ending point of the selection area, the selection area located between the first numerical indicator and the second numerical indicator selected by the user includes a segment of the text to be edited.

Another embodiment of the present disclosure provides a computer program product for editing a text using speech recognition, based on the method described above.

Another embodiment of the present disclosure provides a computer system for editing a text using speech recognition, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention generally relates to the field of speech recognition, and more particularly to a method, system and computer program product for text editing using speech recognition. The following described exemplary embodiments provide a system, method, and computer program product to, among other things, select, via voice commands received from a user, a first target word indicating the beginning of a text to be edited, and a second target word indicating the end of the text to be edited, assign numeric indicators to each occurrence of the first and second target words in the text, and based on a selection of numeric indicators, execute a copy, paste, cut, delete or insert command in areas of the text identified by the numeric indicators. Therefore, the present embodiments have the capacity to improve the technical field of speech recognition by providing an accurate and effective way of selecting and editing a text. Through the insertion of numeric indicators in the text, the user can easily select words associated with the beginning and end of a segment or portion of the text to be copied, cut, or deleted using simple voice commands. Additionally, the same methodology can be applied to paste the copied (or cut) portion of the text to a determined area selected by the user. Similarly, new words or text segments can be inserted in the text by applying the same methodology.

Figure 1:
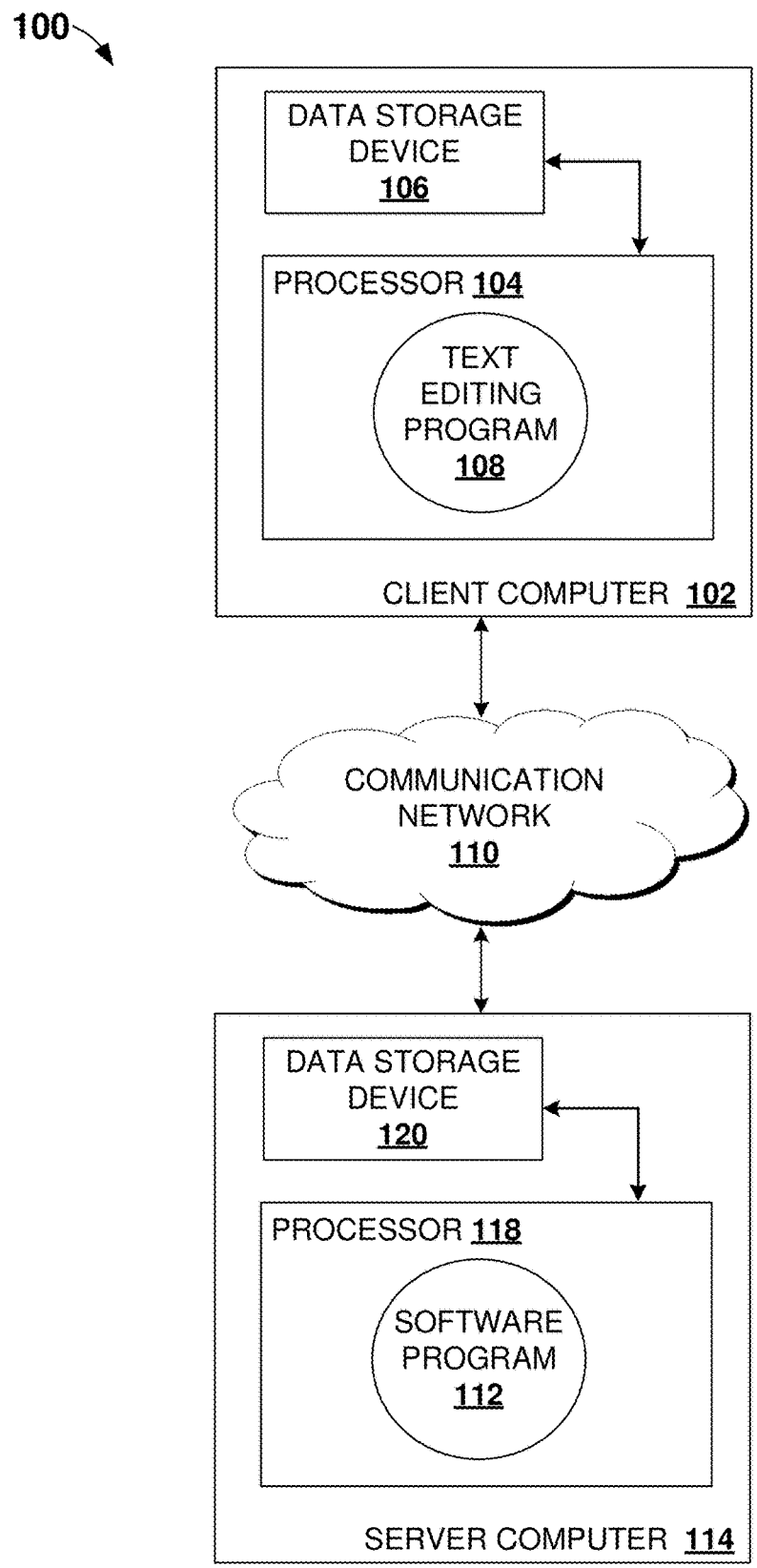
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104 and a data storage device 106 that is enabled to run a text editing program 108. Client computer 102 may be, for example, a mobile device, a telephone (including smartphones), a personal digital assistant, a netbook, a laptop computer, a tablet computer, a desktop computer, or any type of computing devices capable of accessing a network. According to an embodiment, the client computer 102 may include any electronic device with speech or voice recognition/processing capabilities including, for example, electronic device 300 in FIG. 3.

The networked computer environment 100 may also include a server computer 114 with a processor 118 and a data storage device 120 that is enabled to run a software program 112. The software program 112 may be, for example, an application program such as a word processor, email or calendar program. In some embodiments, server computer 114 may be a resource management server, a web server or any other electronic device capable of receiving and sending data. In another embodiment, server computer 114 may represent a server computing system utilizing multiple computers as a server system, such as in a cloud computing environment. Alternatively, in some embodiments, the text editing program 108 may be running on the server computer 114 while the software program 112 may be running on the client computer 102.

The text editing program 108 may communicate with the software program 112 via the communication network 110. As will be discussed with reference to FIG. 6, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2A:
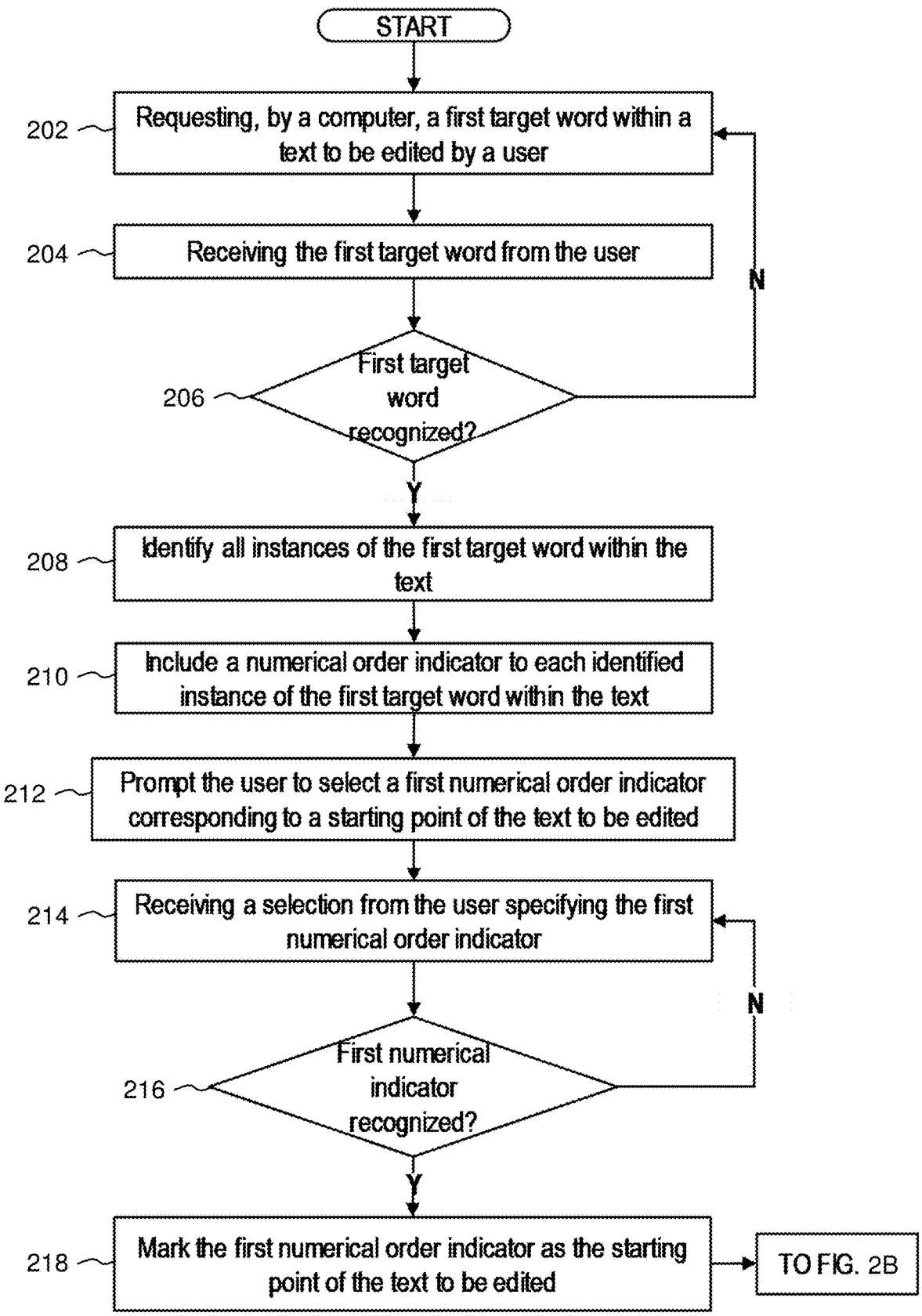
FIGS. 2A-2C are flowcharts illustrating the steps of a method for text editing using speech recognition, according to an embodiment of the present disclosure.
Figure 2B:
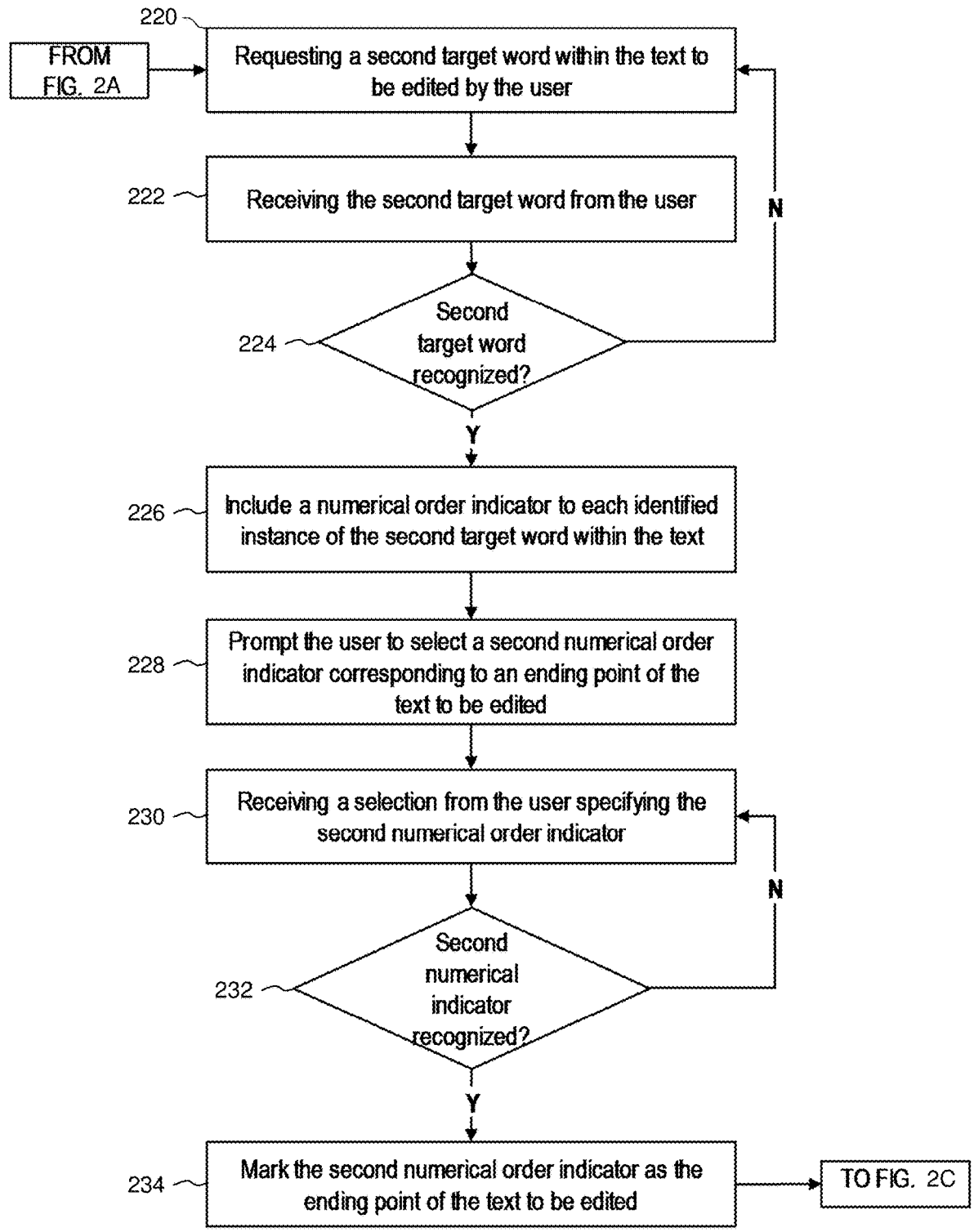
Figure 2C:
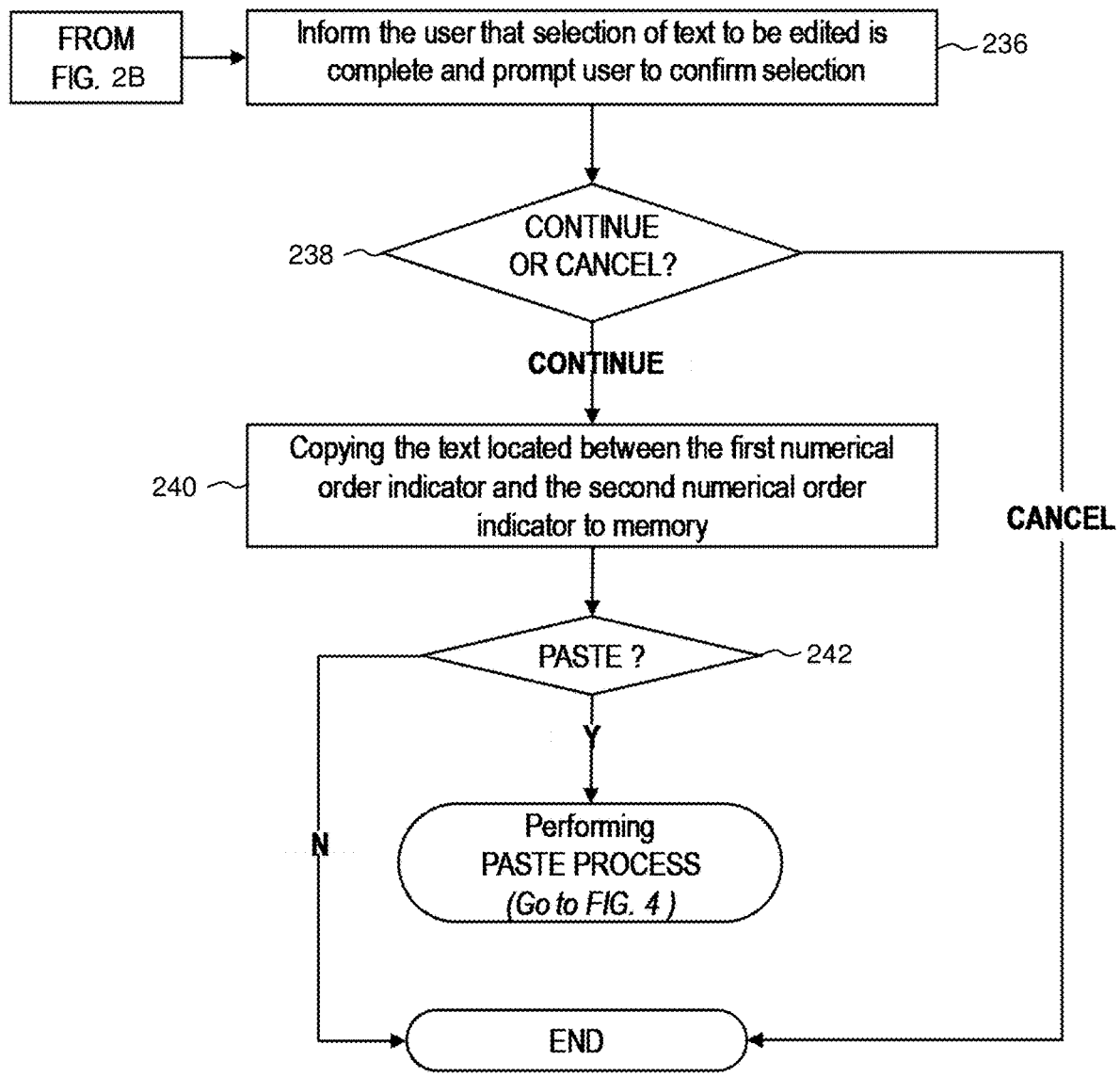
Figure 3:
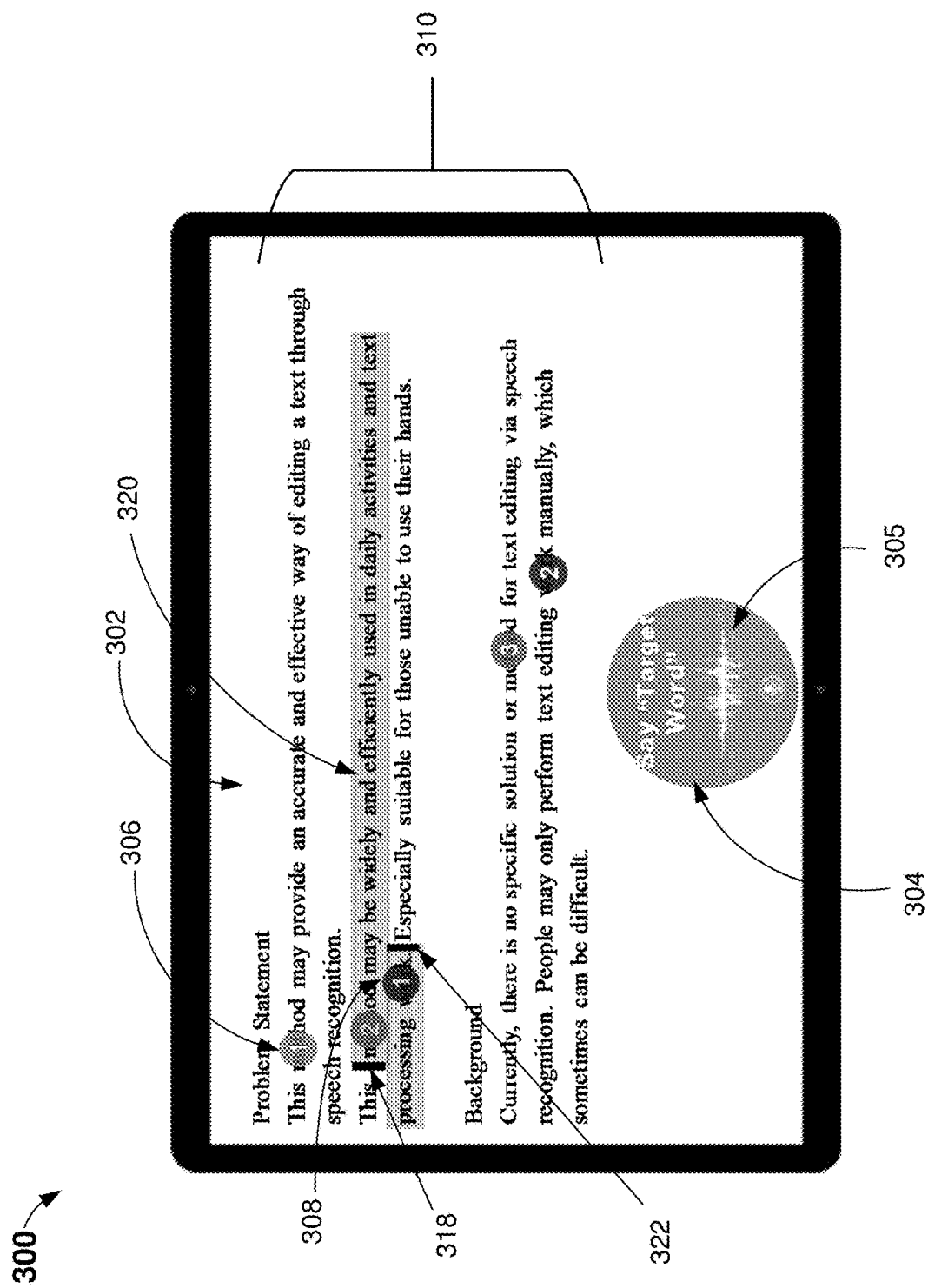
FIG. 3 illustrate an implementation of the method for text editing using speech recognition, according to an embodiment of the present disclosure.

Referring now to FIGS. 2A-2C, flowcharts illustrating the steps of a method for text editing using speech recognition are shown, according to an embodiment of the present disclosure. For illustration purposes, during the description of the flowcharts reference will be made to FIG. 3. FIG. 3 shows an implementation of the proposed method for text editing using speech recognition, according to an embodiment of the present disclosure.

With continued reference to FIGS. 2A-2C and FIG. 3 simultaneously, the process starts at step 202 in which a first request is sent to a user of an electronic device 300 for selecting a first target word 306 located within a text 310. The electronic device 300 includes any device with speech/voice recognition capabilities such as smartphones, tables, laptops, etc. As can be appreciated in FIG. 3, the text 310 is displayed to the user via a screen 302 of the electronic device 300. The text 310 represents a text to be edited by the user. The text 310 may include any set of words within an application or program running on the electronic device 300. For example, the text 310 may be included within a text message, email, or document created using a word processor software.

In this embodiment, the first request is sent to the user via an interface 304 that may also include a speech recognition indicator 305. It should be noted that the interface 304 may be invoked or activated by the user via a voice command including words associated with the action to be performed on the text 310, for example, "edit", "copy", "cut", "insert", "delete", and so on.

According to an embodiment, the first target word 306, requested by the electronic device 300, includes a word within the text 310 indicating a beginning or starting point of an area of the text 310 to be selected. In the exemplary embodiment of FIG. 3, the first target word 306 provided by the user is the word "method".

At step 204, the user's voice input including the first target word 306 is received by the electronic device 300. Based on the electronic device 300 recognizing the first target word 306 at step 206, the process continues with step 208. At step 208, all instances or occurrences of the first target word 306 within the text 310 are identified. If the electronic device 300 does not recognize the first target word 306 at step 206, the process returns to step 202.

At step 210, a numerical order indicator is assigned to each instance of the first target word 306. Stated differently, a number is assigned to each occurrence of the first target word 306 according to an order of appearance within the text 310. In an embodiment, the numerical order indicator(s) may be assigned (in an ascending order) as the first target word 306 is found in the text 310. For instance, in the exemplary embodiment of FIG. 3, the first occurrence of the word "method" (first target word 306) within the text 310 is assigned the number one (1), the second occurrence is assigned the number two (2), and so on. As can be appreciated in FIG. 3, the word "method" appears three times in the text 310.

Once all instances of the first target word 306 have been identified in the text 310, the user is prompted, at step 212, to select a first numerical indicator corresponding to the starting point of a portion or segment of text consisting of one or more words within the text 310 to be selected for editing. Specifically, the user is prompted to choose a numerical indicator associated with any of the identified instances of the first target word 306 (e.g., word "method"). The user speaks the numerical indicator associated with the instance of the first target word 306 corresponding to the desired starting point of the selection process, and the same is received by the electronic device 300 at step 214. In the example of FIG. 3, the user chooses the second instance of the word "method" identified with the numerical indicator two (2) as the starting point of the selection process.

Based on the electronic device 300 recognizing the first numerical indicator corresponding to the starting point of the selection process at step 216, the process continues at step 218 in which the chosen first numerical indicator is marked in the text 310 as the beginning of the text to be selected for editing. As illustrated in FIG. 3, a first marker 318 is positioned right before the second instance (2) of the first target word 306 (i.e., second appearance (2) of the first target word "method" within text 310). The first marker 318 indicates the beginning of a selection area 320 including a portion of the text 310 to be edited. In some embodiments, the first marker 318 can be positioned right after the chosen instance of the first target word 306. It should be noted that a position of the first marker 318 before or after the chosen instance of the first target word 306 can be predetermined by the user(s) of the electronic device 300.

If the electronic device 300, at step 216, does not recognize the first numerical indicator corresponding to the starting point of the selection process spoken by the user, the process returns to step 214, and a warning message may (optionally) be displayed to the user.

The process continues at step 220 (FIG. 2B) in which a second request is sent to the user via the interface 304. According to an embodiment, at step 220, the user is requested to provide a second target word 308. The second target word 308 represents a word indicating an end or final point of the (text) selection process. In the exemplary embodiment of FIG. 3, the second target word 308 provided by the user is the word "work".

At step 222, the user's voice input including the second target word 308 is received by the electronic device 300. Based on the electronic device 300 recognizing the second target word 308 at step 224, the process continues with step 226. At step 226, all instances or occurrences of the second target word 308 within the text 310 are identified. If the electronic device 300 does not recognize the second target word 308 at step 224, the process returns to step 222, and a warning message may (optionally) be displayed to the user.

At step 226, a numerical order indicator is assigned to each instance of the second target word 308. Stated differently, a number is assigned to each occurrence of the second target word 308 according to an order of appearance of the second target word 308 in the text 310. In an embodiment, the numerical order indicator(s) may be assigned in ascending order as the second target word 308 appears in the text 310. For instance, in the exemplary embodiment of FIG. 3, the first occurrence of the word "work" (second target word 308) within the text 310 is assigned the number one (1), the second occurrence is assigned the number two (2), and so on. As can be appreciated in FIG. 3, the word "work" (i.e., second target word 308) appears two times in the text 310.

Once all instances of the second target word 308 have been identified in the text 310, the user is prompted, at step 228, to select a second numerical indicator corresponding to the occurrence of the second target word 308 associated with a desired ending or final point of the selection area 320. Specifically, the user is prompted to choose a numerical indicator associated with any of the identified instances of the second target word 308 (e.g., word "work"). Accordingly, the user speaks or provides the numerical indicator associated with the instance of the second target word 308 corresponding to the desired final point of the selection process. The user's voice input including the selection is then received by the electronic device 300 at step 230. In the example of FIG. 3, the user chooses the first instance of the word "work" identified with the numerical indicator one (1) as the ending point of the selection area 320.

Based on the electronic device 300 recognizing the second numerical indicator corresponding to the ending point of the selection process and hence of the selection area 320 at step 232, the process continues at step 234 in which the chosen second numerical indicator is marked in the text 310 as the end of the text to be selected for editing (i.e., end of the selection area 320). As illustrated in FIG. 3, a second marker 322 is positioned right after the first instance (1) of the second target word 308 (i.e., first appearance (1) of the second target word "work" within text 310). In some embodiments, the second marker 322 can be positioned right after the chosen instance of the second target word 308. The second marker 322 indicates the end of the selection area 320 that includes the portion of the text 310 to be edited. It should be noted that a position of the second marker 322 before or after the chosen instance of the second target word 308 can be predetermined by the user(s) of the electronic device 300.

If the electronic device 300, at step 232, does not recognize the second numerical indicator corresponding to the final point of the selection process spoken by the user, the process returns to step 230, and a warning message may (optionally) be displayed to the user.

Steps 202 through 234 illustrated the process of text selection. Once the areas or portions of the text 310 to be edited have been selected using the proposed method, the process continues at step 236 (FIG. 2C) by informing the user that the selection process has been completed and shading the portions of the text 310 between the first marker 318 and the second marker 322 corresponding to the selection area 320, as shown in FIG. 3. Additionally, at step 236, the electronic device 300 may prompt the user to confirm the selection area 320 is correct (not shown).

At step 238, the electronic device 300 may prompt the user to continue or cancel the text editing process. If the user chooses to cancel, the text editing process ends, and a warning message may (optionally) be displayed to the user. It should be noted that the user may cancel the process at any time by, for example, the voice command "cancel".

If the user chooses to continue with the text editing process, the user, at step 240, may provide a voice command including the editing function to be executed. For example, the user may instruct the electronic device 300 via the voice command to "copy" the selection area 320. In another embodiment, the user may instruct the electronic device 300 via the voice command to "cut" or "delete" the selection area 320. In embodiments in which the user selects or instructs to copy (or cut) the portion of the text 310 corresponding to the selection area 320, the portion of the text 310 is stored in a memory of the electronic device 300. It should be noted that if the user selects to delete the selection area 320, the portion of the text 310 within this are may not be stored in the memory of the electronic device 300.

If the user decides to copy or cut the selection area 320, the electronic device 300 may prompt the user, at step 242, to confirm whether a paste operation will be subsequently performed. In response to the user deciding not to paste the selection area 320 in other areas of the text 310, the process ends. In response to the user providing a voice command indicating to "paste" the selection area 320, the process continues with the paste process described in FIG. 4.

Figure 4:
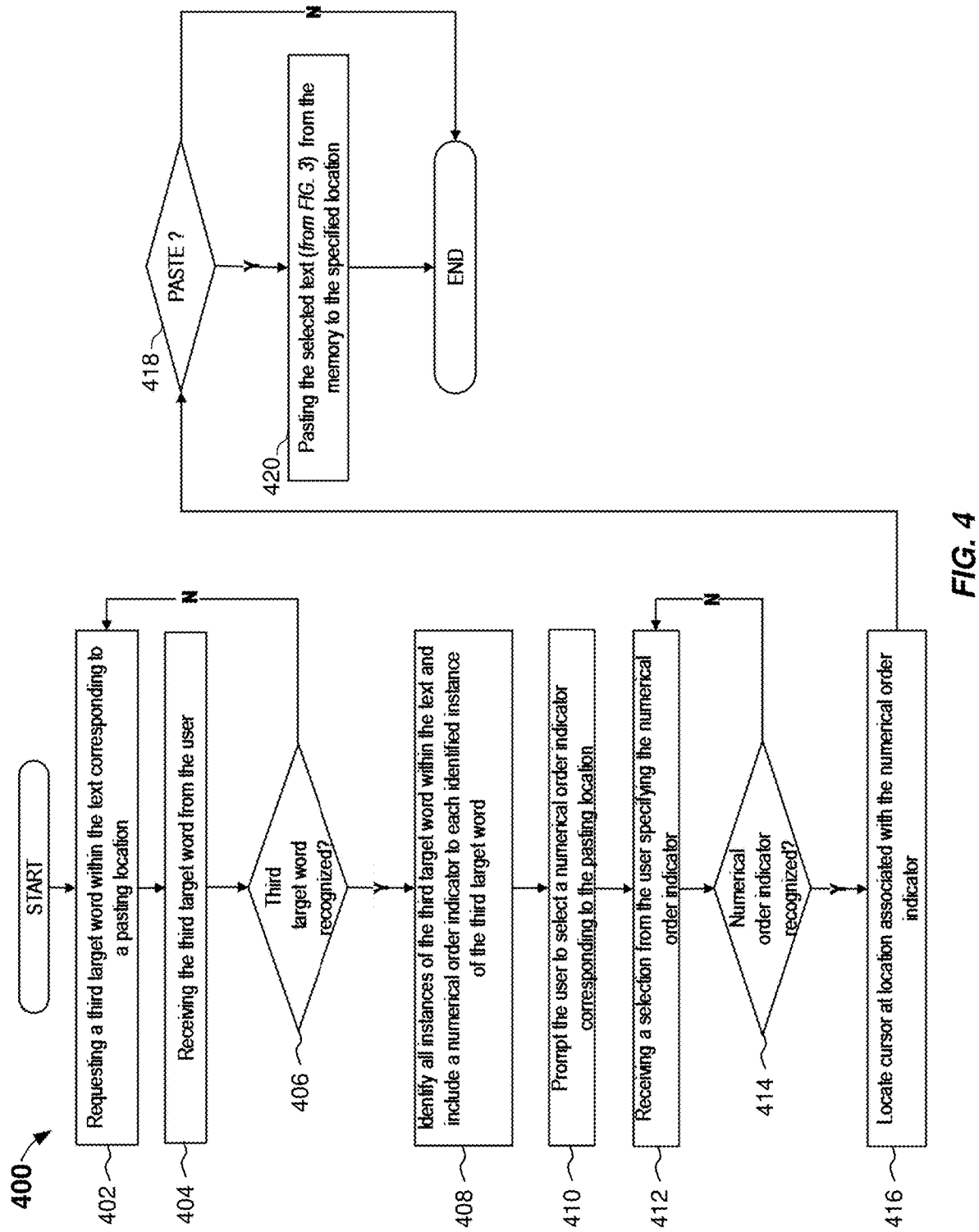
FIG. 4 is a flowchart illustrating the steps for executing a pasting command based on the proposed method for text editing using speech recognition, according to an embodiment of the present disclosure.

Referring now to FIG. 4, a flowchart 400 illustrating the steps of a method for pasting the selection area 320 (FIG. 3) to another location within the text 310 is shown, according to an embodiment of the present disclosure. The process of selecting the location within the text 310 to which the selection area 320 will be pasted is similar to the process of selecting the portion of the text 310 described above.

As shown in the figure, after the user selects to proceed with the "paste" process, a third request is sent to the user at 402 to provide a third target word (not shown) within text 310. The third target word represents a word indicating a location within the text 310 at which the user desires the selection area 320 to be pasted or inserted.

At step 404, the user's voice input including the third target word is received by the electronic device 300. Based on the electronic device 300 recognizing the third target word at step 406, the process continues with step 408. At step 408, all instances or occurrences of the third target word within the text 310 are identified. If the electronic device 300 does not recognize the third target word provided by the user at step 406, the process returns to step 402, and a warning message may (optionally) be displayed to the user.

At step 410, a numerical order indicator is assigned to each instance of the third target word. Stated differently, a number is assigned to each occurrence of the third target word according to an order of appearance within the text 310. The process of assigning the numerical indicator(s) to the third target word is similar to the one performed above for the first target word 306 and second target word 308.

Once all instances of the third target word have been identified in the text 310, the user is prompted, at step 410, to select a third numerical indicator corresponding to the desired location within text 310 to paste the selection area 320 that was previously copied or cut. Specifically, the user is prompted to choose a numerical indicator associated with any of the identified instances of the third target word in the text 310. Then, the user speaks the numerical indicator associated with the instance of the third target word corresponding to the desired pasting location, the same is received by the electronic device 300 at step 412. If the electronic device 300, at step 414, does not recognize the third numerical indicator corresponding to the desired pasting location, the process returns to step 414, and a warning message may (optionally) be displayed to the user.

Based on the electronic device 300 recognizing the third numerical indicator corresponding to the pasting location at step 414, the process continues at step 416 in which a cursor (not shown) of the electronic device 300 is place right before the third target word corresponding to the selected (third) numerical indicator. In some embodiments, the cursor can be positioned right after the chosen instance of the third target word. It should be noted that a position of the cursor before or after the chosen instance of the third target word (not shown) can be predetermined by the user(s) of the electronic device 300.

At step 418, the user is prompted to confirm the execution of the paste process to the location indicated by the cursor. If the user does not proceed with the paste process (cancels), the process ends. Conversely, in response to the user confirming the paste process to the location indicated by the cursor, the selection area 320 is pasted from the memory of the electronic device 300 to the location specified by the cursor (selected location). According to an embodiment, the paste process is performed after receiving the user's voice command including the word "paste".

Figure 5:
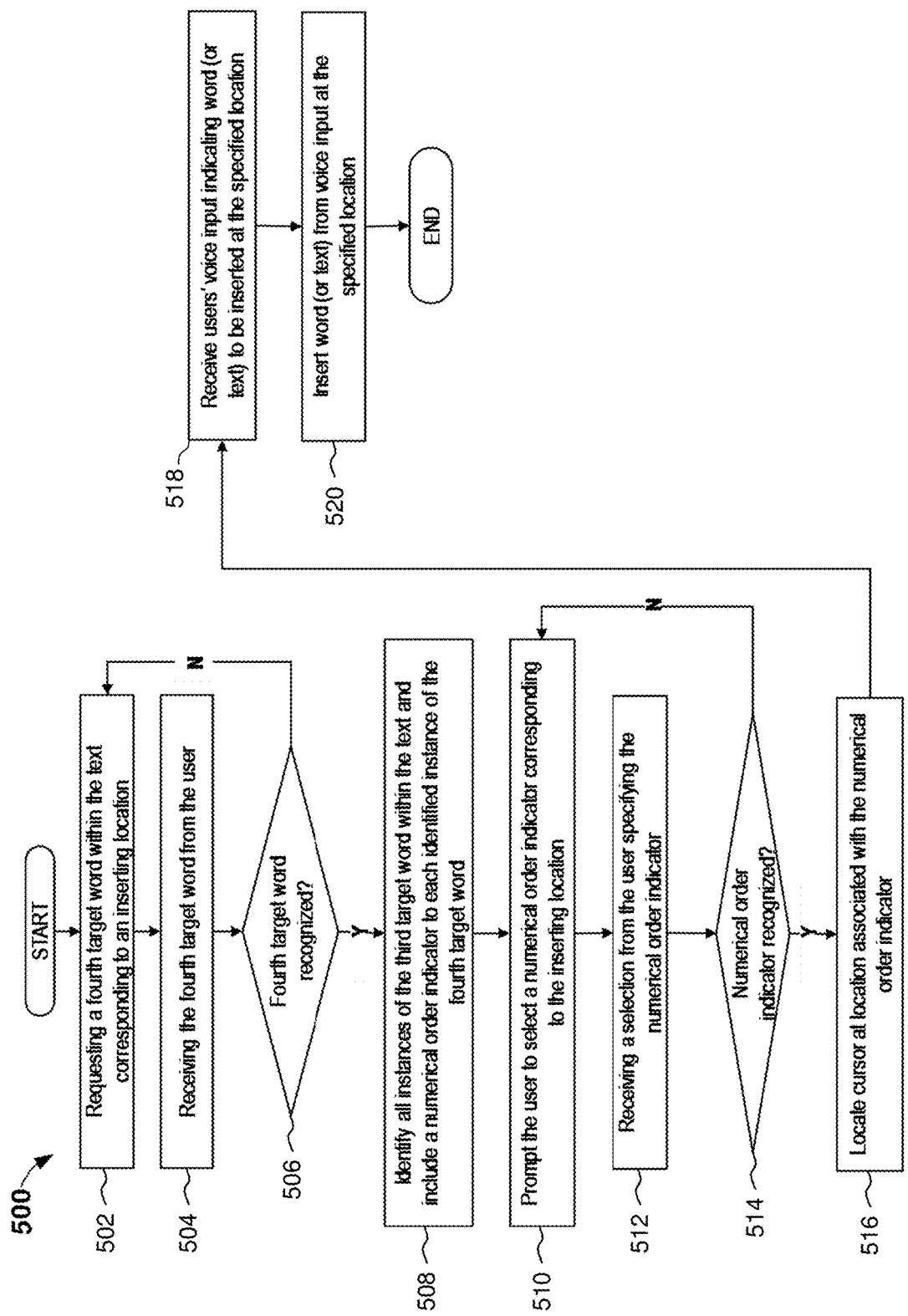
FIG. 5 is a flowchart illustrating the steps for executing an insert command based on the proposed method for text editing using speech recognition, according to an embodiment of the present disclosure.

Referring now to FIG. 5, a flowchart 500 illustrating the steps of a method for inserting a new word or text segment at a desired location within the text 310 is shown, according to an embodiment of the present disclosure. The process of selecting the location within the text 310 at which the new word or text will be inserted is similar to the process of selecting the portion of the text 310 to be edited and pasting it to another location described above with reference to FIGS. 2A through FIG. 4.

The process start at step 502 by sending a fourth request to the user to provide a fourth target word (not shown) within text 310. According to an embodiment, the request may be sent after receiving a voice input from the user including the word "insert". The fourth target word represents a word indicating a location within the text 310 at which the user desires to insert the new word or text segment.

At step 504, the fourth target word is received by the electronic device 300. Based on the electronic device 300 recognizing the fourth target word at step 506, the process continues with step 508. At step 508, all instances or occurrences of the fourth target word within the text 310 are identified. If the electronic device 300 does not recognize the fourth target word provided by the user at step 506, the process returns to step 502, and a warning message may (optionally) be displayed to the user.

At step 510, a numerical order indicator is assigned to each instance of the fourth target word. Stated differently, a number is assigned to each occurrence of the fourth target word according to an order of appearance within the text 310. The process of assigning the numerical indicator(s) to the fourth target word is similar to the one performed above to the first target word 306 and second target word 308.

Once all instances of the fourth target word have been identified in the text 310, the user is prompted, at step 510, to select a fourth numerical indicator corresponding to the desired location within text 310 to insert the new word or text segment. Specifically, the user is prompted to choose a numerical indicator associated with any of the identified instances of the fourth target word within the text 310. Then, the user speaks the numerical indicator associated with the instance of the fourth target word corresponding to the desired inserting location, the same is received by the electronic device 300 at step 512. If the electronic device 300, at step 514, does not recognize the fourth numerical indicator corresponding to the desired inserting location, the process returns to step 514, and a warning message may (optionally) be displayed to the user.

Based on the electronic device 300 recognizing the fourth numerical indicator corresponding to the inserting location at step 514, the process continues at step 516 in which the cursor (not shown) of the electronic device 300 is place right before the occurrence of the fourth target word corresponding to the selected (fourth) numerical indicator, and the user is prompted to provide a voice input indicating the new word or text segment to be inserted in the selected location. In some embodiments, the cursor can be positioned right after the chosen instance of the fourth target word. It should be noted that a position of the cursor before or after the chosen instance of the fourth target word (not shown) can be predetermined by the user(s) of the electronic device 300.

At step 518, the electronic device 300 receives the user's voice input with the new word or text segment to be inserted in the selected location. At step 520, the received voice input is converted to text using any known speech recognition method, and inserted at the selected location within the text 310.

Therefore, embodiments of the present invention provide a system, method, and computer program product that provides an easy and accurate way of editing a text using voice commands. Through the insertion of numeric indicators in the text, a user can easily identify words associated with a start point and a final point of portions of the text to be copied, cut, or deleted using simple voice commands.

Based on the same methodology, paste and insert commands can also be executed. Accordingly, the proposed embodiments provide users with a visual display that facilitates and enhances the editing process, particularly for individuals that, for determined reasons, may not be able to access a keyboard or use their hands as required by standard text editing methods.

Figure 6:
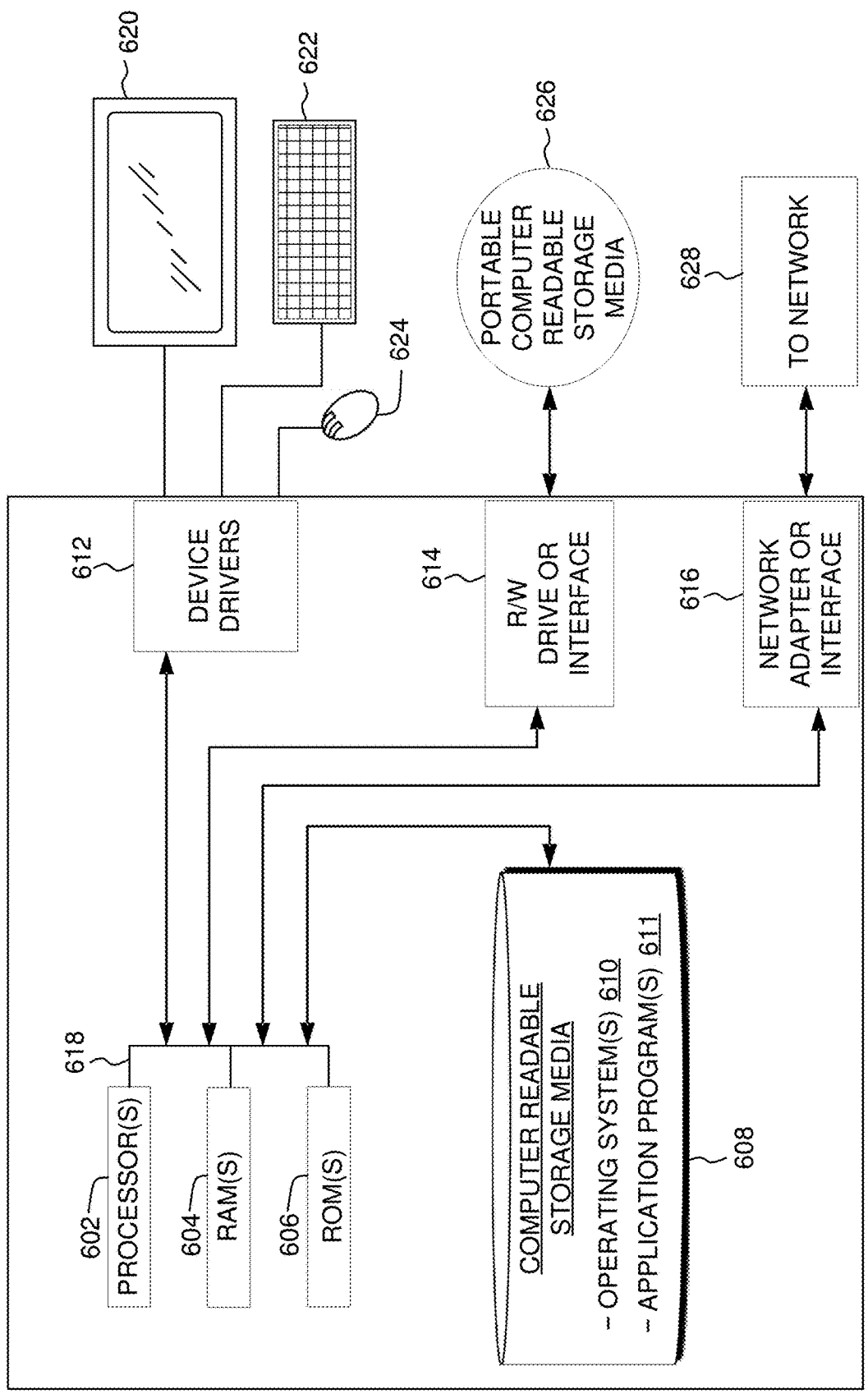
FIG. 6 is a block diagram of internal and external components of a computer system, according to an embodiment of the present disclosure.

Referring now to FIG. 6, a block diagram of components of client computer 102 and server computer 114 of networked computer environment 100 of FIG. 1 is shown, according to an embodiment of the present disclosure. It should be appreciated that FIG. 6 provides only an illustration of one implementation and does not imply any limitations regarding the environments in which different embodiments may be implemented. Many modifications to the depicted environment may be made.

Client computer 102 and server computer 114 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611 are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 614 to read from and write to one or more portable computer readable storage media 626. Application programs 611 on client computer 102 and server computer 114 may be stored on one or more of the portable computer readable storage media 626, read via the respective R/W drive or interface 614 and loaded into the respective computer readable storage media 608.

Client computer 102 and server computer 114 may also include a network adapter or interface 616, such as a TCP/IP adapter card or wireless communication adapter (such as a 4G wireless communication adapter using OFDMA technology) for connection to a network 628. Application programs 611 on client computer 102 and server computer 114 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Client computer 102 and server computer 114 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may include hardware and software (stored on computer readable storage media 608 and/or ROM 606).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
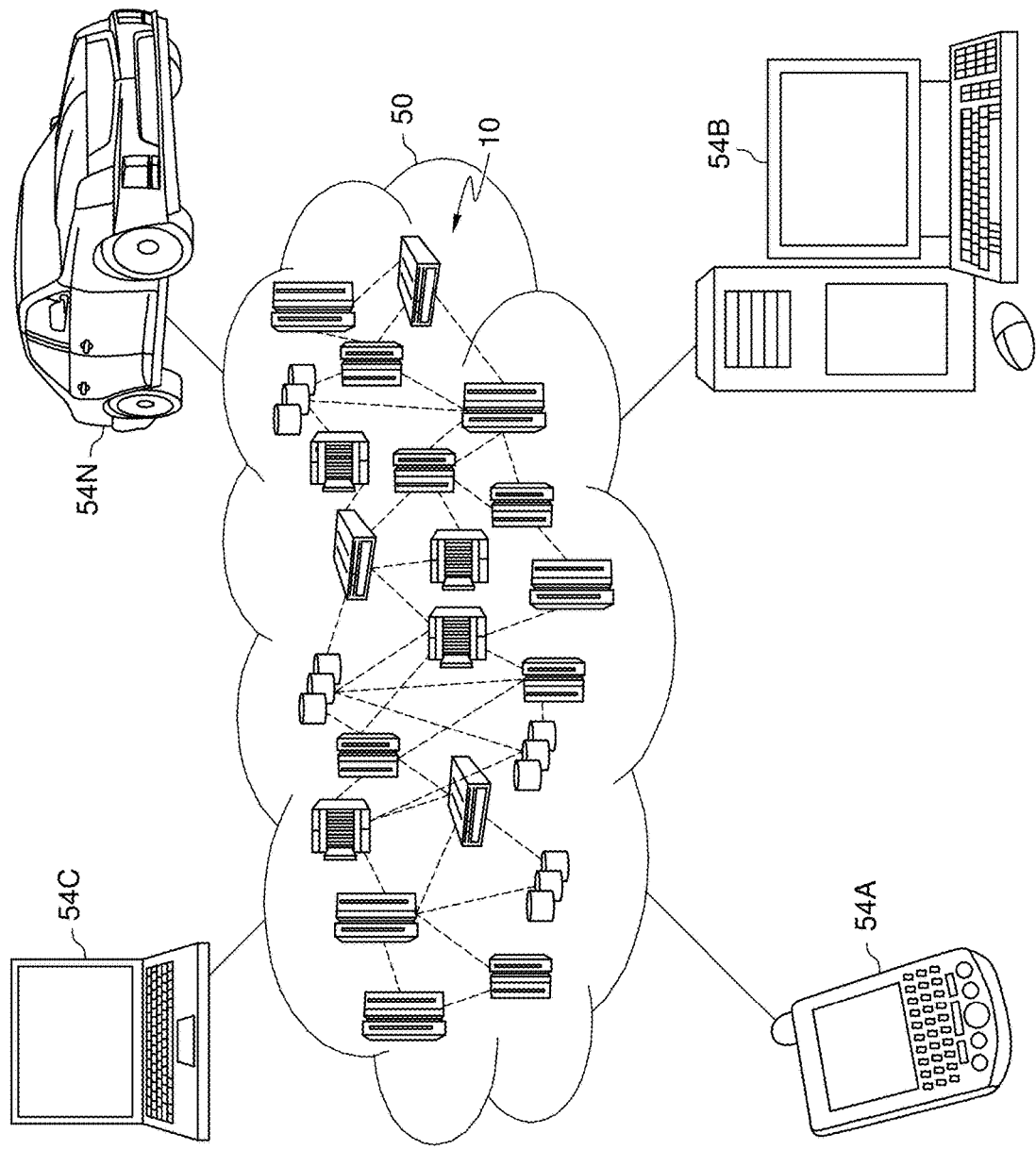
FIG. 7 is a block diagram of an illustrative cloud computing environment, according to an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
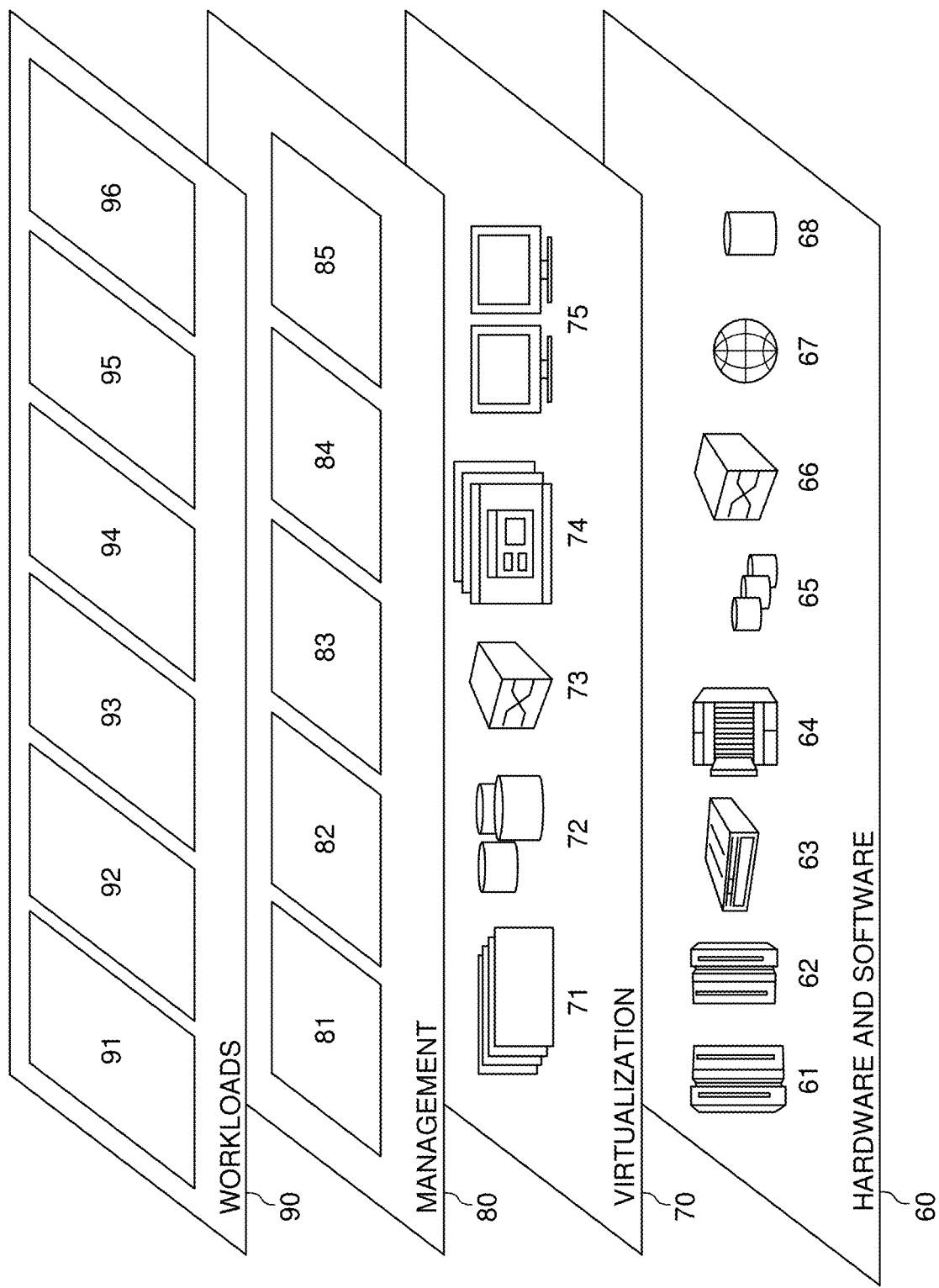
FIG. 8 is a block diagram of functional layers of the illustrative cloud computing environment of FIG. 7, according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for text editing using speech recognition 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for editing a text using speech recognition, comprising:
    receiving, by a computer, a first voice input from a user comprising a first target word;
    identifying, by the computer, instances of the first target word within the text;
    assigning, by the computer, a first numerical indicator to each instance of the first target word within the text;
    receiving, by the computer, a selection from the user comprising the first numerical indicator corresponding to a starting point of a selection area;
    receiving, by the computer, a second voice input from the user comprising a second target word;
    identifying, by the computer, instances of the second target word within the text;
    assigning, by the computer, a second numerical indicator to each instance of the second target word within the text; and
    receiving, by the computer, a selection from the user comprising the second numerical indicator corresponding to an ending point of the selection area, wherein the selection area located between the first numerical indicator and the second numerical indicator selected by the user comprises a segment of the text to be edited.

2. The method of claim 1, further comprising:
    executing, by the computer, in the selection area an editing command selected by the user from the group consisting of a copy command, a cut command, a paste command, a delete command, and an insert command.

3. The method of claim 1, further comprising:
    placing, by the computer, a first marker before the first numerical indicator corresponding to the starting point of the selection area; and
    placing, by the computer, a second marker after the second numerical indicator corresponding to the ending point of the selection area.

4. The method of claim 1, further comprising:
    copying, by the computer, the selection area to a memory device.

5. The method of claim 1, further comprising:
    receiving, by the computer, a third voice input from the user comprising a third target word;
    identifying, by the computer, instances of the third target word within the text;
    assigning, by the computer, a third numerical indicator to each instance of the third target word within the text;
    receiving, by the computer, a selection from the user comprising the third numerical indicator corresponding to a location within the text to paste the selection area; and
    pasting, by the computer, the selection area to the location corresponding to the third numerical indicator.

6. The method of claim 5, further comprising:
    placing, by the computer, a cursor before the third numerical indicator corresponding to the location to paste the selection area; or
    placing, by the computer, the cursor after the third numerical indicator corresponding to the location to paste the selection area, wherein placing the cursor before or after the third numerical indicator is predetermined by the user.

7. The method of claim 1, further comprising:
    receiving, by the computer, a fourth voice input from the user comprising a fourth target word;
    identifying, by the computer, instances of the fourth target word within the text;
    assigning, by the computer, a fourth numerical indicator to each instance of the fourth target word within the text;
    receiving, by the computer, a selection from the user comprising the fourth numerical indicator corresponding to a location within the text to insert one or more words;
    receiving, by the computer, the one or more words from the user; and
    inserting, by the computer, the one or more words in the location associated with the fourth numerical indicator.

8. A computer system for editing a text using speech recognition, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving, by a computer, a first voice input from a user comprising a first target word;
    identifying, by the computer, instances of the first target word within the text;
    assigning, by the computer, a first numerical indicator to each instance of the first target word within the text;
    receiving, by the computer, a selection from the user comprising the first numerical indicator corresponding to a starting point of a selection area;
    receiving, by the computer, a second voice input from the user comprising a second target word;
    identifying, by the computer, instances of the second target word within the text;
    assigning, by the computer, a second numerical indicator to each instance of the second target word within the text; and
    receiving, by the computer, a selection from the user comprising the second numerical indicator corresponding to an ending point of the selection area, wherein the selection area located between the first numerical indicator and the second numerical indicator selected by the user comprises a segment of the text to be edited.

9. The computer system of claim 8, further comprising:
    executing, by the computer, in the selection area an editing command selected by the user from the group consisting of a copy command, a cut command, a paste command, a delete command, and an insert command.

10. The computer system of claim 8, further comprising:
placing, by the computer, a first marker before the first numerical indicator corresponding to the starting point of the selection area; and
placing, by the computer, a second marker after the second numerical indicator corresponding to the ending point of the selection area.

11. The computer system of claim 8, further comprising:
copying, by the computer, the selection area to a memory device.

12. The computer system of claim 8, further comprising:
receiving, by the computer, a third voice input from the user comprising a third target word;
identifying, by the computer, instances of the third target word within the text;
assigning, by the computer, a third numerical indicator to each instance of the third target word within the text;
receiving, by the computer, a selection from the user comprising the third numerical indicator corresponding to a location within the text to paste the selection area; and
pasting, by the computer, the selection area to the location corresponding to the third numerical indicator.

13. The computer system of claim 12, further comprising:
placing, by the computer, a cursor before the third numerical indicator corresponding to the location to paste the selection area; or
placing, by the computer, the cursor after the third numerical indicator corresponding to the location to paste the selection area, wherein placing the cursor before or after the third numerical indicator is predetermined by the user.

14. The computer system of claim 8, further comprising:
receiving, by the computer, a fourth voice input from the user comprising a fourth target word;
identifying, by the computer, instances of the fourth target word within the text;
assigning, by the computer, a fourth numerical indicator to each instance of the fourth target word within the text;
receiving, by the computer, a selection from the user comprising the fourth numerical indicator corresponding to a location within the text to insert one or more words;
receiving, by the computer, the one or more words from the user; and
inserting, by the computer, the one or more words in the location associated with the fourth numerical indicator.

15. A computer program product for editing a text using speech recognition, comprising:
a computer readable storage medium having program instructions embodied therewith, wherein the computer readable storage medium is not a transitory signal per se, the program instructions executable by a device to cause the device to perform a method comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a computer, a first voice input from a user comprising a first target word;
identifying, by the computer, instances of the first target word within the text;
assigning, by the computer, a first numerical indicator to each instance of the first target word within the text;
receiving, by the computer, a selection from the user comprising the first numerical indicator corresponding to a starting point of a selection area;
receiving, by the computer, a second voice input from the user comprising a second target word;
identifying, by the computer, instances of the second target word within the text;
assigning, by the computer, a second numerical indicator to each instance of the second target word within the text; and
receiving, by the computer, a selection from the user comprising the second numerical indicator corresponding to an ending point of the selection area, wherein the selection area located between the first numerical indicator and the second numerical indicator selected by the user comprises a segment of the text to be edited.

16. The computer program product of claim 15, further comprising:
executing, by the computer, in the selection area an editing command selected by the user from the group consisting of a copy command, a cut command, a paste command, a delete command, and an insert command.

17. The computer program product of claim 15, further comprising:
placing, by the computer, a first marker before the first numerical indicator corresponding to the starting point of the selection area; and
placing, by the computer, a second marker after the second numerical indicator corresponding to the ending point of the selection area.

18. The computer program product of claim 15, further comprising:
copying, by the computer, the selection area to a memory device.

19. The computer program product of claim 15, further comprising:
receiving, by the computer, a third voice input from the user comprising a third target word;
identifying, by the computer, instances of the third target word within the text;
assigning, by the computer, a third numerical indicator to each instance of the third target word within the text;
receiving, by the computer, a selection from the user comprising the third numerical indicator corresponding to a location within the text to paste the selection area; and
pasting, by the computer, the selection area to the location corresponding to the third numerical indicator.

20. The computer program product of claim 15, further comprising:
receiving, by a computer, a fourth voice input from the user comprising a fourth target word;
identifying, by the computer, instances of the fourth target word within the text;
assigning, by the computer, a fourth numerical indicator to each instance of the fourth target word within the text;
receiving, by the computer, a selection from the user comprising the fourth numerical indicator corresponding to a location within the text to insert one or more words;
receiving, by the computer, the one or more words from the user; and inserting, by the computer, the one or more words in the location associated with the fourth numerical indicator.

* * * * *